J. DAWSON.
Straw Cutter.
No. 9,470.
Patented Dec. 14, 1852.
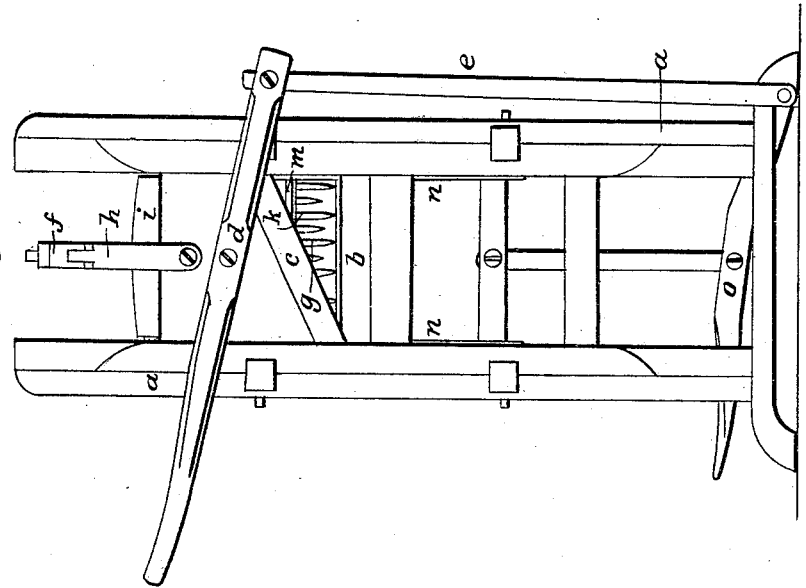
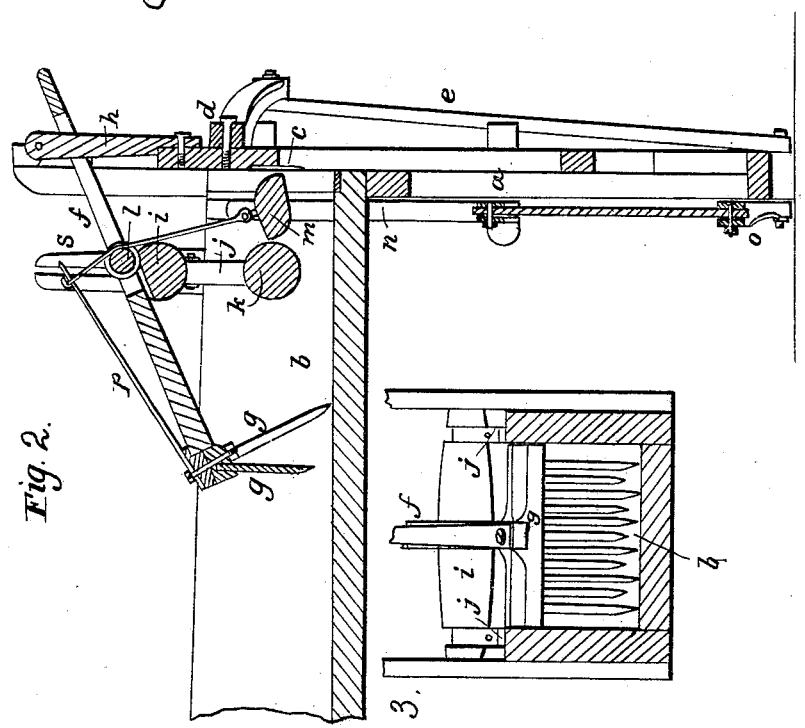

UNITED STATES PATENT OFFICE.

JOEL DAWSON, OF BARNESVILLE, OHIO.

STRAW-CUTTER.

Specification of Letters Patent No. 9,470, dated December 14, 1852.

*To all whom it may concern:*

Be it known that I, JOEL DAWSON, of Barnesville, in the county of Belmont, in the State of Ohio, have invented a new and useful Machine for Cutting Straw, Corn-Stalks, Hay, and other Fodder; and I do hereby declare that the following is a full, clear, and exact description of the construction and operation of the same, reference being had to the annexed drawings, making a part of this specification, in which—

Figure 1 is a front elevation of my improved "straw cutter"; Fig. 2, a longitudinal and vertical section of the same cutting centrally, and Fig. 3 a transverse section taken in the rear of the rake and through the trough $b$.

The construction of the frame and a portion of the parts are similar in many respects to other machines for the same purpose now in use.

At the front resting on a suitable foot piece uprights $a$ are placed with an ordinary receiving trough $b$ securely affixed. Between the uprights $a$ the cutting frame slides carrying the knife $c$ acted upon by the hand lever $d$ having its fulcrum at the head of the upright lever $e$ which is secured in the foot piece of the frame.

Projecting up from the cutting frame and passing a slot in the bar $f$ of the double rake $g$ is another bar $h$ having a pin near its upper edge for the purpose of retaining the bar $f$ of the rake in place, about the center point of the bar $f$ a round cross piece $i$ is placed, upon which the bar is secured. This cross piece ($i$) has two other pieces $j$ connected with it near its extremities and descending down with a roller $k$ at their lower ends; the pieces $j$ supporting the roller $k$ working up and down in grooves cut in the side of the feed box, and the cross piece $i$ working up and down in grooves cut in the standards $s$.

On the head of the rake a strong spring $p$ is fastened extending to the cross piece $i$, from this spring a cord passes over a roller $l$ in the slot of the bar $f$ and is fastened to the pressure piece $m$, this pressure piece or roller is secured to the slide pieces $n$ properly which have a cross tie at their lower ends and from this tie a bar reaches and connects with a treadle $o$, thus completing the arrangement.

The operation is as follows: When the cutting frame is brought to its lowest point the rake is raised to admit the material to be cut, and upon giving the upward stroke the material to be cut is forced forward by the descent and forward movement of the rake while pressure piece $m$ and roller $k$ are raised with their frames. This pressure piece $m$ is then brought hard down on the material by means of the treadle $o$ and then the cutting frame descends completing the cut,—the roller $k$ acting at the same time with the pressure piece $m$ by means of the spring and cord to guide the feed beneath the pressure piece.

What I claim as my invention and desire to secure by Letters Patent is—

In combination with the rake and spring, the pressure piece ($m$) and the roller ($k$) constructed and arranged in the manner and for the purpose as hereinbefore set forth.

JOEL DAWSON.

Witnesses:
RICH. E. FRASIER,
JOSEPH FRY.